Feb. 11, 1958 W. J. MEANS ET AL 2,823,358
COAXIAL SWITCHES
Filed Oct. 7, 1953 8 Sheets-Sheet 1

INVENTORS W. J. MEANS
T. SLONCZEWSKI
BY
ATTORNEY

Feb. 11, 1958 W. J. MEANS ET AL 2,823,358
COAXIAL SWITCHES
Filed Oct. 7, 1953 8 Sheets-Sheet 2

INVENTORS W. J. MEANS
T. SLONCZEWSKI
BY
ATTORNEY

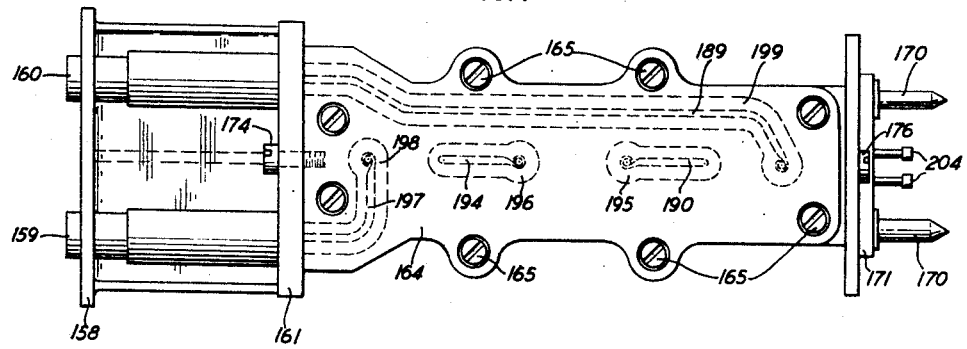
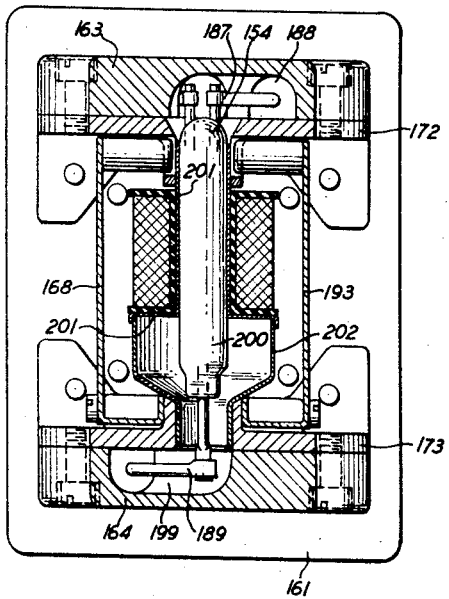
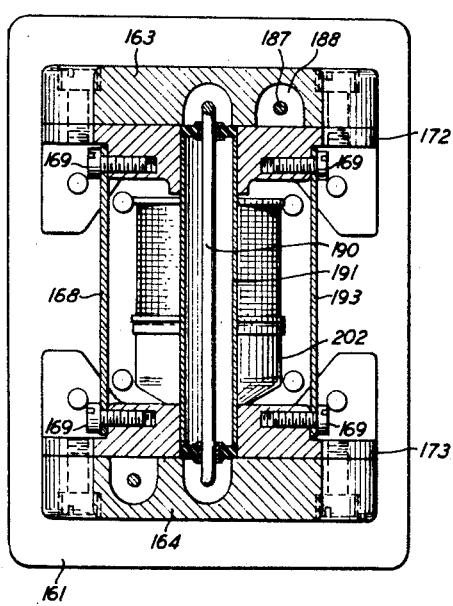

Feb. 11, 1958 W. J. MEANS ET AL 2,823,358
COAXIAL SWITCHES
Filed Oct. 7, 1953 8 Sheets-Sheet 4

INVENTORS W. J. MEANS
T. SLONCZEWSKI
BY
ATTORNEY

INVENTORS W. J. MEANS
T. SLONCZEWSKI
BY
ATTORNEY

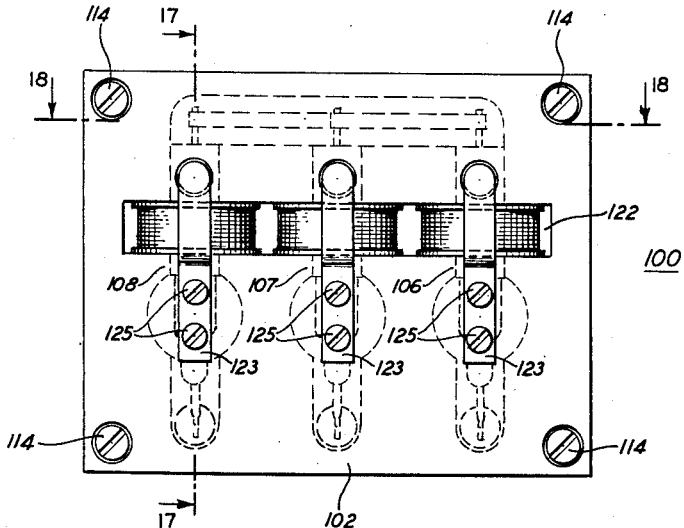
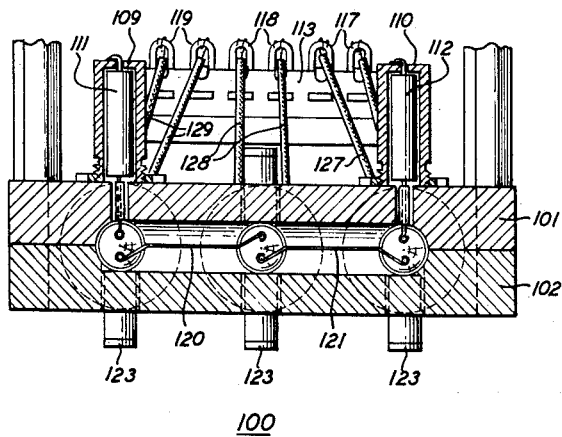
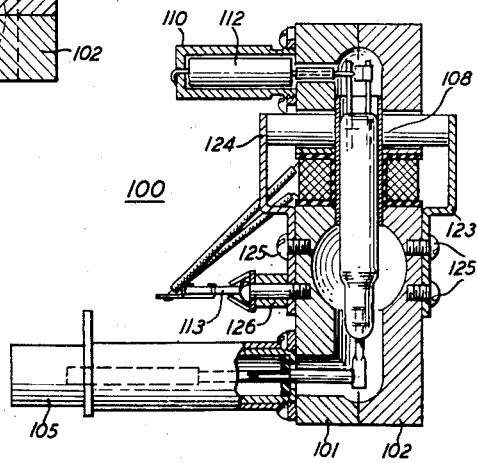

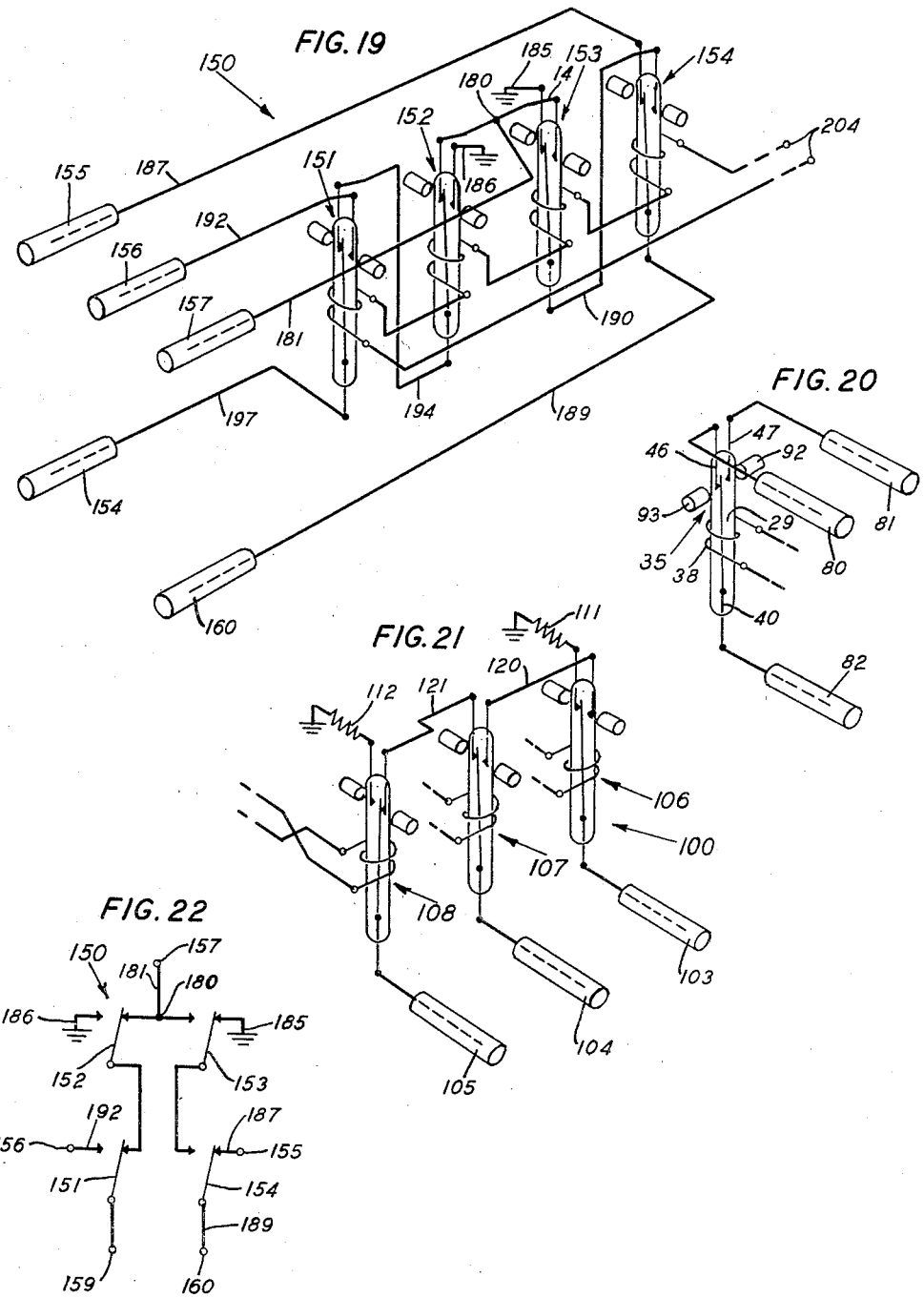

Feb. 11, 1958 W. J. MEANS ET AL 2,823,358
COAXIAL SWITCHES
Filed Oct. 7, 1953 8 Sheets-Sheet 8
FIG. 24
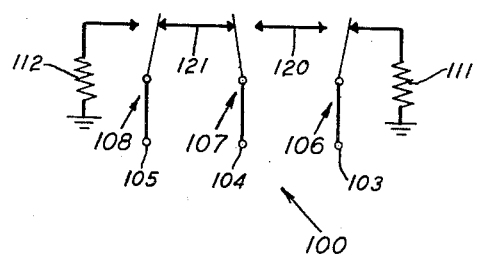
FIG. 23
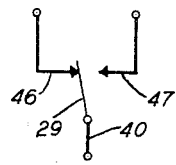
FIG. 25
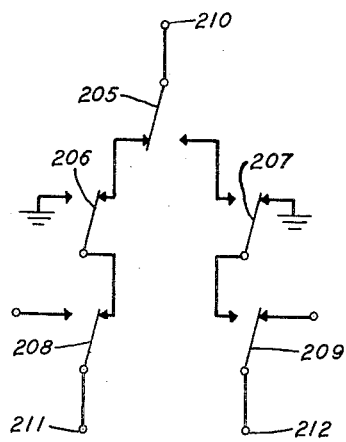
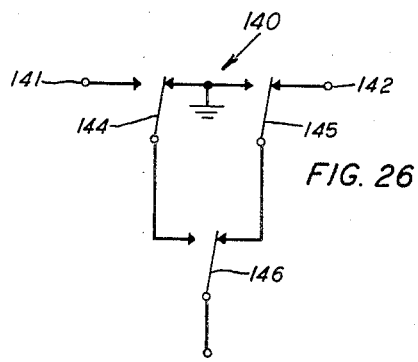
FIG. 26
INVENTORS W. J. MEANS
T. SLONCZEWSKI
BY
ATTORNEY

United States Patent Office

2,823,358
Patented Feb. 11, 1958

2,823,358
COAXIAL SWITCHES

Winthrop J. Means and Thaddeus Slonczewski, Summit, N. J., assignors to Bell Telephone Laboratories, Incorporated, New York, N. Y., a corporation of New York Application October 7, 1953, Serial No. 384,742

18 Claims. (Cl. 333—97)

This invention relates to electrical switching apparatus and more particularly to a switching device for use with high frequency electrical apparatus in the 100 megacycle range.

It is well known that conduction at very high frequencies does not follow the conventional pattern associated with direct or comparatively low frequency currents. In the region of microwaves this effect becomes so pronounced that connections no longer resemble wiring systems but are more like plumbing systems with provisions made to "pipe" currents from point to point. The present invention is for use in the range where electrical conductors are still utilized but where the problems encountered in handling of such high frequencies in the order of tens and hundreds of megacycles have to be carefully considered.

Conductors which are utilized for the transmission of high frequency waves are generally utilized in pairs spaced relatively close to minimize radiation therefrom. Spacing between such pairs of conductors, the sizes of the individual conductors, and the dielectric between them determine certain transmission characteristics of the transmission line, one of which is known as the surge impedance, or characteristic impedance. Abrupt changes in such impedance along a transmission line generally produce deleterious effects, as is well known in the art. The conductors may be arranged in a coaxial manner with one enveloping the other to further minimize radiation effects. At frequencies that require coaxial conduction, conventional relays and switching means are disadvantageous because the current cannot be confined to the usual conducting elements of such devices and the impedance irregularities offered by such elements may be excessively high. Moreover, when high frequency currents are utilized, the impedance mismatch and capacitive coupling in such devices cause standing waves and undesirable crosstalk.

In accordance with the present invention a multielement coaxial switch is provided, with each element being a mercury contact, fast-operating polar relay of the type described in the Patent 2,609,464 to J. T. L. Brown and C. E. Pollard, Jr., of September 2, 1952. The coaxial switch provides for a connection between a first terminal and one or the other of a second and third terminal with low and stable insertion loss and close approximation to constant impedance. The coaxial switch comprises, in one modification, two metallic blocks which, when joined, form passageways that enclose the relay elements and the connections therebetween. The passageway walls become effectively the outer conductor in the coaxial arrangement of the switch. The passageways are designed to maintain the coaxial arrangement by maintaining the ratio of outer conductor to inner conductor and by providing compensations for the various discontinuities or abrupt changes in impedance introduced by the relay element components. For example, the effect of the mercury pools in the relay element is compensated for by shaped recesses or bulges in the structure.

Dependent upon circuit requirements the coaxial switch may have one, three, four or five relay elements; when the unused terminal of the switch must be connected to a matching impedance three relay elements are required; when the connections between the relay elements must be grounded as well as the unused terminal connected to a matching impedance, four relay elements are required; and when additionally, Y connections must be avoided, five relay elements are required. In each modification the relay elements are simultaneously operated to provide for a connection between a first terminal or channel and one or the other of a second and third terminal or channel. The characteristic impedance of an ideal coaxial conductor does not change with frequency. From a practical standpoint, however, irregularities such as are presented by insulating discs or by Y connections place an upper limit beyond which the impedance shows irregularities. Such irregularities may be compensated for, and if the compensation is provided for close to the source of irregularity, the cutoff frequency is not materially lowered.

In the four-element switch, a Y connection is utilized. The capacitive effect of the Y connection is compensated for by shaping the passageway in the adjacent portion of the central terminal of the Y connection to increase the inductance thereof.

It is therefore an object of the present invention to provide for a novel coaxial switch utilizing a plurality of fast-acting mercury contact relays.

A feature of the present invention relates to the provision of a novel multielement coaxial switch comprising two metallic blocks which, when properly mated, provide for coaxial passageways therethrough that connect the terminals of the elements.

Another feature of the present invention pertains to the provision of a highly sensitive novel coaxial switch having a plurality of simultaneously operating relay elements such that the operating speed of the switch is less than two milliseconds.

Another object of the present invention is to provide a novel coaxial switch which provides for a low and stable insertion loss and for low crosstalk between switching channels.

Still another object of the present invention is to provide a mercury contact coaxial relay which has a compensating bulge surrounding the mercury pool.

Still another feature of the present invention relates to the provision of a novel mercury contact coaxial relay having a plurality of relay elements with each Y connection in the coaxial relay being electrically compensated for in the connection to the central terminal of the Y connection.

Still another feature of the present invention pertains to the provision of a novel mercury contact coaxial switch having a plurality of relay elements wherein unused terminals are connected to matching impedances, and wherein floating links between elements are grounded.

Still another feature of the present invention relates to the provision of a novel coaxial switch having mercury wetted contacts to provide for a constant contact resistance.

Still another feature of the present invention relates to the provision of a novel multielement coaxial switch having an operating circuit for simultaneously operating the elements of said switch, and a shield for each of said elements to isolate said operating circuit from the circuits controlled by said switch.

Further objects, features and advantages will become apparent to those skilled in the art upon consideration of the following description taken in conjunction with the drawings wherein:

Fig. 7 is a bottom view of the four-element coaxial switch of the present invention;

Fig. 8 is a sectional view of the four-element coaxial switch of the present invention taken along line 8—8 in Fig. 2;

Fig. 9 is a sectional view of the coaxial switch of the present invention taken along line 9—9 in Fig. 2;

Fig. 16 is a front view of the three-element coaxial switch of the present invention;

Fig. 17 is a sectional view taken along line 17—17 in Fig. 16 of the three-element coaxial switch of the present invention;

Fig. 18 is a sectional view taken along line 18—18 in Fig. 16 of the three-element coaxial switch of the present invention;

Fig. 19 is an electromechanical representation of the four-element switch of the present invention;

Fig. 20 is an electromechanical representation of the single element switch of the present invention;

Fig. 21 is an electromechanical representation of the three-element switch of the present invention;

Fig. 22 is a circuit representation of the four-element switch of the present invention;

Fig. 23 is a circuit representation of the single element switch of the present invention;

Fig. 24 is a circuit representation of the three-element switch of the present invention;

Fig. 25 is a circuit representation of a five-element switch of the present invention; and Fig. 26 is a circuit representation of a Y connected three-element switch of the present invention.

Figure 1:
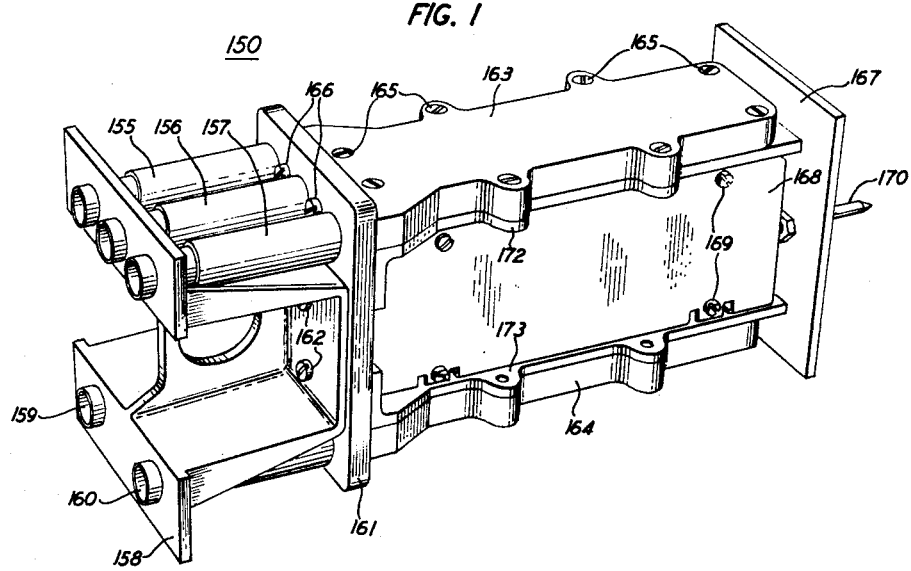
Fig. 1 is a pictorial view of the four-element switch of the present invention.

The principles of the present invention are exemplified in five different switches; a single element switch shown in Figs. 10 through 13, 20 and 23; the three-element coaxial switch shown in Figs. 14 through 18, 21 and 24; a three-element coaxial switch diagrammatically shown in Fig. 26; a four-element coaxial switch shown in Figs. 1 through 9, 19 and 22; and a five-element coaxial switch diagrammatically shown in Fig. 25.

The elements that are utilized in the various switches are fast-acting mercury wetted contact polar relays of the type described in the Patent 2,609,464 to J. T. L. Brown and C. E. Pollard, Jr., on September 2, 1952. The invention is not necessarily restricted to the specific relay element shown therein but may be adapted to function in a satisfactory manner with any mercury wetted contact polar relay as is well known in the art.

Referring to Figs. 10 through 13, 20 and 23 which illustrate the single element coaxial switch 30 of the present invention, the relay element 35 is supported between the metallic blocks 31 and 32. The relay 35 has an 8000-ohm driving winding 38 which is supported on a shield or sleeve 37 and which is connected to the operating terminals 55 and 56 through leads 57. The terminals 55 and 56 are secured to a bar 90 which is supported on block 32 by the screws 53 and 54 and the spacers 51 and 52. Depending upon the polarity of the energizing current which is supplied through the terminals 55 and 56, the relay element 35, as is hereinafter described, selects one of two paths therethrough. The driving or operating winding 38 fits into the slots or passageways 58 and 59 in the blocks 31 and 32, respectively. The shield 37, which supports the winding 38, is in turn supported between the blocks 31 and 32, being flared at both ends so that it makes good electrical contact with the blocks 31 and 32 when they are clamped together. The blocks 31 and 32, which are shaped to accommodate the shield 37 together with the remainder of the relay element 35, are clamped together by the screws 60 and 61 which are threaded into holes 75 and 76 in block 31 through holes 73 and 74 in block 32, respectively. The shield 37 supports therein the glass tube 36 which in turn supports the metallic lead 40, the mercury pool 39, the tapered armature 29 and the pole-pieces 46 and 47. The pole-pieces 46 and 47 support, at their lower ends, the alternative contact surfaces with which the armature 29 makes contact. The blocks 31 and 32 have passageways 71 and 50 which enclose the exterior portions of pole-pieces 46 and 47 and also the metallic straps 48 and 49 which connect the pole-pieces 46 and 47 to the inner conductors of the coaxial terminals or jacks 80 and 81. The coaxial terminals 80, 81 and 82 have mounting members 83, 84 and 85, respectively, which are utilized to mount the coaxial switch 30 on a frame, not shown. The conductor in terminal 82 is connected to lead 40, described above, through the passageway 41. The terminals 80, 81 and 82 are mechanically connected to the block 32 by the plates 86, 87 and 88, respectively, by the screws 89. The lead 40, straps 48 and 49, and the pole-pieces 46 and 47 may be gold-plated to reduce their inductance and resistance.

The switch 30 provides a coaxial connection between the terminal 82 and either of the terminals 80 or 81.

The passageways or cavities 50 and 71, described above, and the cavities 72 and 91 in blocks 31 and 32, respectively, which surround the lead 40, and cavities or bulges 33 and 34 in blocks 31 and 32, respectively, which surround the mercury pool 39 in the glass tube 36, are proportioned to duplicate the characteristic impedance of the coaxial lines, not shown, which are connected to the terminals or jacks 80, 81 and 82. The characteristic impedance of a coaxial line is determined by the formula $$Z \text{ (in ohms)} = \frac{138}{\sqrt{K}} \log_{10} \frac{D}{d}$$

where K is the dielectric constant of the cavity, D is the inside diameter of the cavity and d is the outside diameter of the centrally located conductor. It is evident from the formula that the ratio of the inside diameter D of the cavity to the outside diameter d of the inner conductor, in switch 30, must be constant in order for the characteristic impedance to be constant. For a characteristic impedance of 75 ohms for example, the ratio of $$\frac{D}{d}$$

must be approximately 3 to 1.

The operation of the relay element 35 is controlled by the cylindrical permanent magnets 92 and 93 which are fitted in or accommodated in the channels or grooves 70 and 43 in blocks 31 and 32, respectively. The magnets 92 and 93 are maintained in position by the magnetic side plates 62 and 63 which are secured to the blocks 31 and 32 by means of the screws 64 and 65. The magnets 92 and 93 may be permanently attached to the side plates 63 and 62, respectively, or may be separate therefrom. When the magnets 92 and 93 are in position the assembly forms a sensitive polarized relay of the type described in the J. T. L. Brown et al. patent identified above. The reed armature 29 may be actuated to the pole-piece 46 or the pole-piece 47 by passing the current of proper polarity through the operating winding 38. It is possible to so adjust the strengths of the two magnets 92 and 93 so that the armature has a normal position against one of the pole-pieces 46 or 47. The magnets 92 and 93 may also be so adjusted that the armature 29 remains on whichever of the two pole-pieces 46 and 47 it was contacting, when the operating current is removed from the winding 38. The current through the winding 38 is effective to actuate the armature 29 even though the winding 38 is completely shielded by the shield 37 from the contents of tube 36. Some of the low frequency flux produced by the energized operating winding 38 penetrates through the shield 37 and is effective to cause the operation of the relay element 35 and the movement of the armature 29 from one of the pole-pieces 46 or 47 to the other. The high frequency currents, however, which pass through the relay element 35 are isolated by the shield 37 from the operating winding 38. The shield 37 in this manner functions to allow low frequency magnetic flux to penetrate into the tube 36 and prevents high frequency radiation from exiting therethrough. This function occurs due to the skin effect phenomena which occurs at high frequencies so that the high frequency currents passing through the relay element 35 do not penetrate the shield 37. The low frequency flux, however, produced by the winding 38, though attenuated for a brief interval, penetrates the shield 37 to cause the operation of the relay element 35.

The outer conductor path traversed through the switch 30 by the high frequency currents is from the terminal 82, described above, along the passageway 41, the passageway formed by the grooves 72 and 91, the bulges 33 and 34, the shield 37, the passageway formed by the grooves 71 and 50, to one of the other of passageways 45 and 44 to the terminals 80 and 81, respectively. The inner conductor path traversed by the high frequency currents through switch 30 is from the conductor in terminal 82, the conductor in passageway 41, the lead 40 which passes into the tube 36 to the mercury pool 39, the armature 29 and then either a path through pole-piece 46, strap 48 and the conductor in terminal 80 or a path through pole-piece 47, strap 49 and the conductor in terminal 81. The outer conductive path traced through the switch 30 above, provides a continuous outer surface, shaped to compensate for the discontinuities caused by the inner conductive path also traced above. The bulges 33 and 34 approximate the shape of the mercury pool 39 in tube 36, maintaining a fairly constant ratio of outer conductor to inner conductor to maintain a constant characteristic impedance throughout the coaxial switch 30. The insertion loss of switch 30 between 75 ohm terminations, for example, is less than .1 decibel attenuation at 80 megacycles. The difference between the insertion losses of the two possible paths through switch 30 is less than .0002 decibel at 8 megacycles.

The capacitance through the switch 30 between connected and disconnected paths is of the order of .5 micro-microfarad. For applications where the .5 micro-microfarad coupling across the contact surfaces of pole-pieces 46 and 47 is not tolerable, a three-element or triple switch 100 shown in Figs. 14 through 18, 21 and 24 is utilized. The switch 100 is also constructed on what may be referred to as the split block principle since it comprises two mating blocks 101 and 102. The block 101 supports the terminals or jacks 103, 104 and 105 which electrically connect the switch 100 to external circuits or channels, not shown. The blocks 101 and 102 enclose three sensitive relay elements 106, 107 and 108 which are similar to the relay element 35 described above. The relay elements 106, 107 and 108 are arranged in a vertical plane with interconnecting leads 120 and 121 at their upper ends. The blocks 101 and 102 are connected to each other by the screws 114 which pass through the holes 115 in block 102 to the threaded holes 116 in block 101. Each of the blocks 101 and 102 has a slotted opening 122 for the windings of the relay elements 106, 107 and 108. The magnets of the relay elements 106, 107 and 108 are held in position by the magnetic side plates or brackets 123 and 124 which are connected to the blocks 102 and 101, respectively, by the screws 125. A spacer 126, shown more particularly in Fig. 17, supports the terminal board 113 containing the terminals 117, 118 and 119 on the side plate 124. The terminals 117, 118 and 119 are connected by means of leads 127, 128 and 129, respectively, to the windings of relays 108, 107 and 106. The terminals 117, 118 and 119 are connected in a manner, not shown, by which the three windings of the relay elements 106, 107 and 108 may be simultaneously energized. The three operating windings or coils of relay elements 106 through 108 may be placed in series or in parallel to be operated simultaneously or they may be operated in sequence if so desired.

An incoming terminal 104 can be transferred from one to the other of the output terminals 103 and 105 when the windings of the relay elements 106, 107 and 108 are energized. The additional switching function provided by utilizing three relay elements instead of just one is the termination of the unused terminal 103 or 105 to a matching impedance 111 or 112. The impedance devices 111 and 112 are enclosed in stubs 109 and 110 to which they are grounded, and they are also connected to one of the pole-pieces of the relay elements 106 and 108, respectively. As shown specifically in Figs. 21 and 24, which illustrate the electrical circuit features of the three-element switch 100, the incoming terminal 104 is connected through the relay element 107, the lead 121 and the relay element 108 to the outgoing terminal 105. The outgoing terminal 103 is connected through relay element 106 to the impedance device 111. When the switch 100 is operated, or when the three relay elements 106, 107 and 108 are simultaneously energized, the incoming terminal 104 becomes connected through the relay element 107, lead 120 and the relay element 106 to the outgoing terminal 103, and the outgoing terminal 105 is terminated through the relay element 108 to the impedance device 112. In this manner the deleterious capacitive effect which occurs as described above in the single element coaxial switch 30 is materially reduced by terminating the unused path in a matching impedance device.

In the three-element switch 100 described above the unused path is terminated in a matching impedance 111 or 112, but a further deleterious effect is introduced by using three relay elements 106 through 108. When the terminal 104 is connected to the terminal 105, as shown in Figs. 21 and 24, the link 120 is not connected at either end or it "floats." The floating link 120 introduces an undesirable capacitive effect. A three-element switch, such as switch 140, diagrammatically shown in Fig. 26 having elements 144, 145 and 146, can be provided which avoids floating links, but the termination of the unused one of terminals 141 or 142 in a matching impedance cannot also be provided. To provide for both features, that is, the termination of the unused terminal in a matching impedance and the grounding or avoiding of floating links, the use of four relay elements is required.

The switch 150 shown in Figs. 1 through 9, 19 and 22 having four relay elements 151 through 154 achieves the dual function described above. The switch 150 is not constructed on a split block principle as is the single element coaxial switch 30 or the three-element coaxial switch 100 described above. While the switch 150 may also be constructed on the split block principle, there are considerable equipment advantages to be gained by making its frontal area small. Three terminals 155, 156 and 157 are arranged horizontally across the top of the front plate 161, and two terminals 159 and 160 are arranged across the bottom thereof. The switch 150 functions as is hereinafter described to connect the terminal 157 to one of the other of the terminals 159 and 160. The unused one of terminals 159 and 160 is connected to one of the terminals 155 or 156 which is connected to a matching impedance device, not shown, or to coaxial conductors also not shown. The terminals 155, 156, 157, 159 and 160 are supported against a front or face plate 161 by the metallic member 158 which is connected to the front plate 161 by means of the screws 162. The face plate 161, together with an end plate 167, supports horizontal metallic blocks 172 and 173. The metallic blocks 172 and 173 support therebetween the relay elements 151 through 154 which are similar to the relay elements described above in reference to the coaxial switches 30 and 100. The horizontal metallic blocks 172 and 173 are connected to the end plate 167 and the face plate 161 by means of the screws 175 and 176, respectively. The horizontal metallic blocks 172 and 173 support horizontal cover plates 163 and 164 which are connected thereto by the screws 165, and to the front plate 161 by the screws 166 and 174, respectively. The cover plates 163 and 164, together with the horizontal metallic blocks 172 and 173, form an outer conductor for the interconnections, hereinafter described, between the relay elements 151 through 154. The sides of relay elements 151 through 154 are shielded by the magnetic side plates 168 and 193 which are attached to the metallic blocks 172 and 173 by the screws 169 and which support the relay element magnets. As shown specifically in Fig. 1, the switch 150 is completely enclosed by the various components briefly described above.

Figure 5:
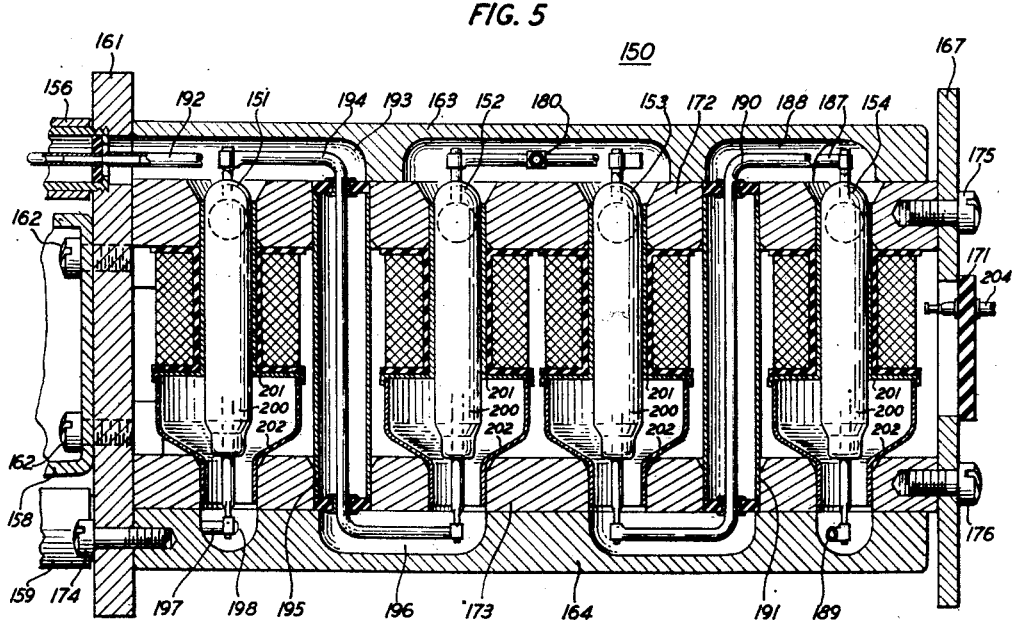
Fig. 5 is a partial sectional view of the four-element coaxial switch of the present invention taken along line 5—5 in Fig. 3.
Figure 3:
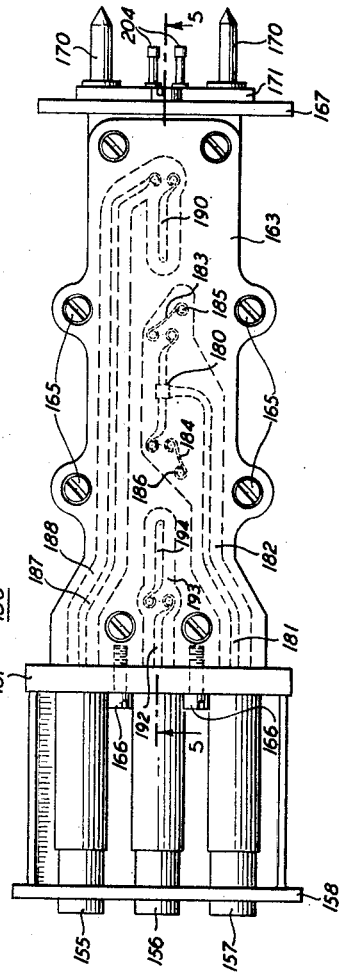
Fig. 3 is a top view of the four-element switch of the present invention.
Figure 2:
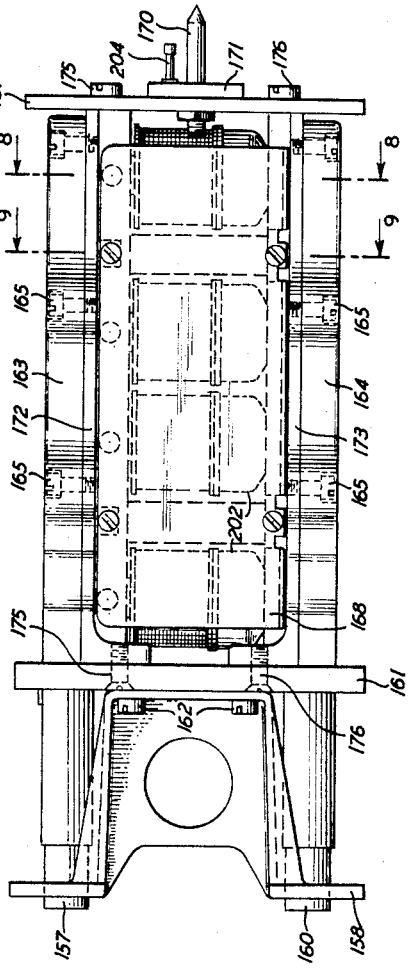
Fig. 2 is a side view of the four-element switch of the present invention.
Figure 6:
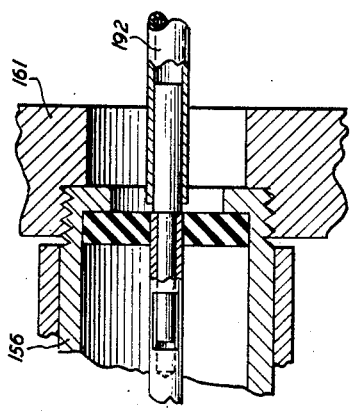
Fig. 6 is an enlarged partial sectional view of the connection at a coaxial terminal.
Figure 4:
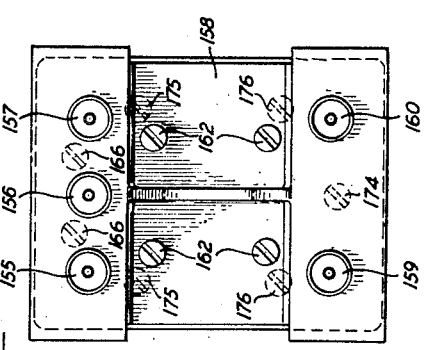
Fig. 4 is a front view of the four-element switch of the present invention.
Figure 10:
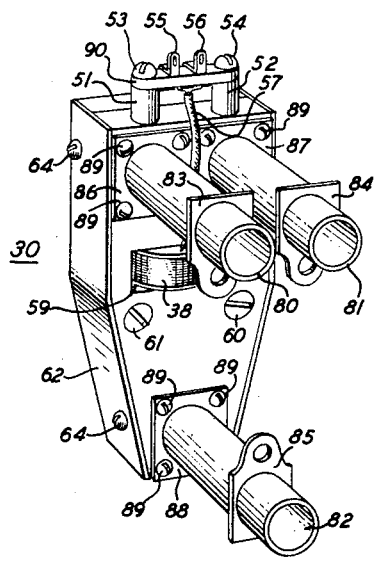
Fig. 10 is a pictorial view of the single element coaxial switch of the present invention.
Figure 11:
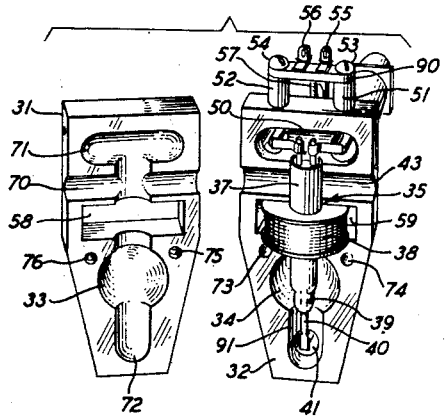
Fig. 11 is a partially exploded view of the single element coaxial switch of the present invention.
Figure 12:
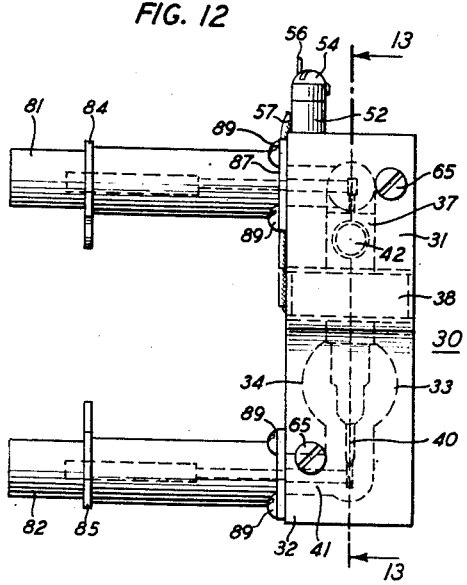
Fig. 12 is a side view of the single element coaxial switch of the present invention.
Figure 13:
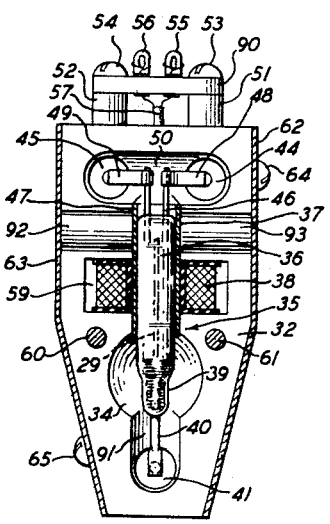
Fig. 13 is a sectional view taken along line 13—13 in Fig. 12 of the single element coaxial switch of the present invention.
Figure 14:
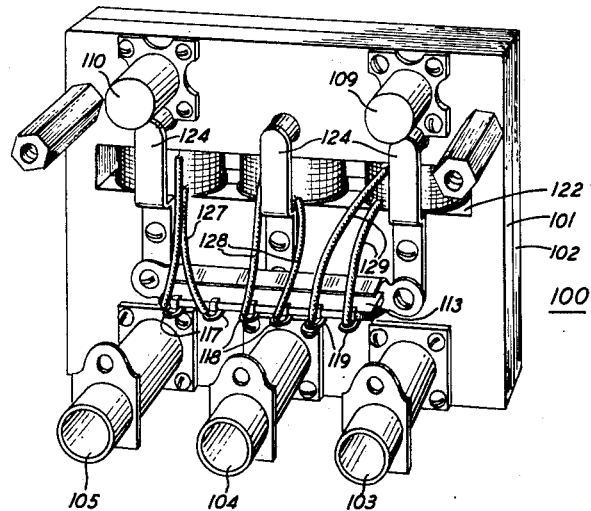
Fig. 14 is a pictorial view of the three-element coaxial switch of the present invention.
Figure 15:
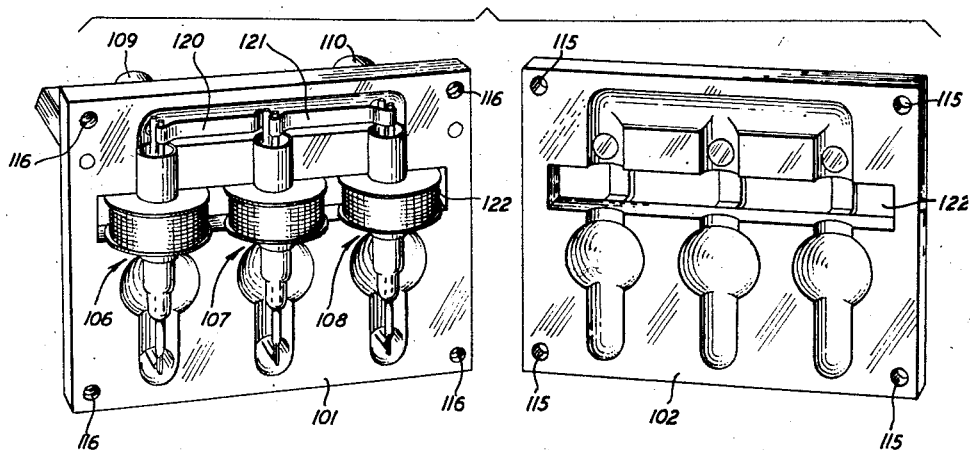
Fig. 15 is a partially exploded view of the three-element coaxial switch of the present invention.

In the normal condition of the relay elements 151 through 154, the common terminal 157 is connected to the terminal 159. The path from the common terminal 157 is through the lead 181, shown also in Fig. 3, to the junction or Y connection 180. The lead 181 and the Y connection 180 are enclosed in the U-shaped channel, groove, or passageway 182 in the cover plate 163. The passageway 182 is a U-shaped passageway which, together with the top of the metallic block 172, approximates an outer cylindrical conductor. The Y connection 180 is connected to the adjacently opposite pole-pieces of the relay elements 152 and 153. The connection to the pole-piece of the relay element 153 when the relay elements 151 through 154 are normal is a stub or open circuit connection. This stub is compensated for in a manner hereinafter described. The connection to the pole-piece of the relay element 152 proceeds through the relay element 152 to the lead 194 which, as shown in Fig. 5, is enclosed in a metallic cylinder 195, to a pole-piece of the relay element 151. The pole-piece of the relay element 151 is connected through the lead 197, in the passageway 198, to the coaxial terminal 159. The lead 194 which passes through the cylinder 195 is enclosed in the passageway 193 in the cover plate 163 and in a passageway 196 in the cover plate 164. In this manner the common terminal 157 is connected to one of the alternative terminals 159. When the terminal 157 is connected to the terminal 159, the terminal 160, which is the unused alternative terminal, is connected to terminal 155. The terminal 160 is connected through the lead 189 as shown specifically in Fig. 7 which is enclosed in the passageway 199 in the bottom cover plate 164, to the bottom of the relay element 154. The connection from the lead 189 (see particularly Fig. 19) is through the relay element 154 to the lead 187 which is enclosed in the passageway 188 in the top cover plate 163, to the terminal 155. With element 153 normal, a ground connection 185 is provided to the link or lead 190 which otherwise would be floating.

When the switch 150 is operated, or when the windings of the relay elements 151 through 154 are simultaneously energized, the common terminal 157 becomes connected to the terminal 160, and the terminal 159 becomes terminated or connected to the impedance terminal 156. The path from the common terminal 157 to the alternative terminal 160 is through the lead 181 in passageway 182, the Y connection 180, through the relay element 153, lead 190 in passageway 188, the relay element 154 and lead 189 in passageway 199 to the terminal 160. The path from the terminal 159 to the impedance terminal 156 is through lead 197 in passageway 198, the relay element 151 and lead 192 in passageway 193 to the terminal 156. In this manner the operation of the switch 150 connects the previously unused one of terminals 159 and 160 to the common terminal 157, and connects the previously used one of terminals 159 and 160 to either the impedance terminal 155 or the impedance terminal 156. When switch 150 is operated, it also provides a ground connection 186 through element 152 to ground lead 194. The switch 150 is operated when potential is applied across terminals 204 which are mounted on block 171 which is in turn mounted on end plate or block 167. The block 167 also supports the plugs 170 which are utilized to support the switch 150. The windings of the relay elements 151 through 154 are serially connected to terminals 204.

The glass tubes 200 of the relay elements 151 through 154 are supported in a flanged metallic shield 201. The shield 201 engages a metallic bulge member 202 which is shaped to conform with the mercury pools in the relay elements 151 through 154. The shield members 201, together with the bulges 202, form outer conductive paths for the relay elements 151 through 154. The upper part of the shield members 201 and the bottom of the bulge members 202 have multiple contact fingers so that they make good contact, respectively, with the horizontal blocks 172 and 173.

The Y connection 180, described above, introduces capacitive coupling due to the stub connection to one of the relay elements 152 or 153. The impedance irregularity introduced by this stub is compensated for by increasing the inductance of lead 181, utilizing a relatively small diameter lead therefor.

To avoid the use of a Y connection, a five-element switch in accordance with the principles of the present invention may be utilized. Fig. 25 shows the circuit representation of such a switch having five relay elements 205 through 209 providing for a connection between terminal 210 and one of the terminals 211 and 212.

It is to be understood that the above-described arrangements are illustrative of the application of the principles of this invention. Numerous other arrangements may be devised by those skilled in the art without departing from the spirit and scope of the invention.

What is claimed is:

1. A switch for selectively connecting one coaxial cable to another electrically similar coaxial cable, comprising a plurality of mercury contact relay elements which form part of the inner conduction system of said switch; coaxial conductor means for interconnecting said relay elements; operating means for simultaneously actuating said relay elements; electromagnetic shielding means separating said relay elements and said operating means; and impedance compensating means to reduce the mismatch caused by the mercury in said relay elements.

2. A switch in accordance with claim 1 comprising in addition two partially mating metallic blocks enclosing said relay elements and forming together with said shielding means and said compensating means an outer conductor in a coaxial path through said switch.

3. A switching device for use with high frequency electrical currents including two partially mating metallic blocks forming a plurality of passageways; mercury contact relay elements enclosed in said passageways; coaxial terminals for said switching device; links in said passageways between said relay elements; and connections between said terminals and said relay elements, said connections, said links and said relay elements functioning as inner conductors and said passageways as outer conductors of coaxial paths through said switching device, and means for actuating said relay elements whereby the inner conductors are changed.

4. A switching device in accordance with claim 3 comprising in addition means including some of said relay elements for grounding unused ones of said links between said relay elements.

5. A switching device in accordance with claim 4 comprising an addition impedance means for terminating the unused ones of said terminals.

6. A switching device in accordance with claim 5 wherein said connections include a Y connection and wherein said passageways provide for a constant ratio between the diameters of the outer and inner conductors of the coaxial path through said switch and in which the inner conductors are reduced in diameter adjacent said Y connection to compensate for the capacitive effect introduced thereby.

7. A switching device in accordance with claim 5 wherein said passageways are shaped to conform with the conductive components of said relay elements at a fixed ratio therefrom.

8. A coaxial switch having at least a normal and an operated condition; said switch having inner conductive paths; outer conductive paths, said inner conductive paths comprising a mercury contact relay having a mercury pool and mercury wetted conductive elements having at least a normal and an operated condition, said outer conductive path comprising partially mating metallic blocks and a metallic shield, said blocks and said shield together surrounding said relay and providing therewith for at least two possible coaxial paths through said switch; and means for operating said relay.

9. A switch in accordance with claim 8 wherein said metallic blocks have bulges which enclose said mercury pool to provide a constant characteristic impedance through said switch.

10. A switch in accordance with claim 9 wherein said bulges conform in shape at a fixed diametric ratio to the shape of said mercury pool.

11. A coaxial switch for selectively connecting one coaxial conductor to another electrically similar coaxial conductor comprising an input coaxial terminal, a plurality of output coaxial terminals, a plurality of impedance matching terminals, at least four mercury contact polar relays, supporting metallic blocks in spaced relationship for supporting said relays, metallic cover plates mating with and supported by said supporting blocks and forming therewith outer conductive connections of a coaxial system providing for connections between said relays and between said relays and said terminals, inner conductive leads supported between said supporting blocks and said cover plates in spaced relationship from said outer conductive connections, a shield member and a bulge member for each of said relays forming an outer conductive path therefor, and means for simultaneously energizing said relays to cause the normally unused ones of said plurality of output terminals to be connected through at least two of said relays to said input terminal, and to cause the normally used ones of said plurality of output terminals to be connected through at least two of said relays to one of said impedance matching terminals.

12. A coaxial switch in accordance with claim 11 comprising in addition means for grounding said inner conductive leads which are not connected by said operated relays to any of said terminals to avoid capacitive coupling.

13. A coaxial switch in accordance with claim 12 comprising in addition two spaced magnetic side plates supported by said horizontal blocks, said relays being arranged in a row between said side plates and having magnets supported by said plates.

14. A coaxial switch in accordance with claim 13 wherein said inner conductive leads include a Y connection comprising a central terminal and two arms, said central terminal of said Y connection having a diameter providing for a larger diametric ratio of said outer conductive connections to said inner conductive leads than elsewhere in said switch.

15. A coaxial switch in accordance with claim 14 wherein said relays have mercury pools and said bulge members conform to the shape of said mercury pools in said relays at a predetermined distance therefrom to provide for a constant characteristic impedance through said switch.

16. A switching device for use wtih high frequency electrical currents including two partially mating metallic blocks forming a plurality of passageways; mercury contact relay elements enclosed in said passageways comprising permanent magnetic members supported in said passageways by said metallic blocks; coaxial terminals for said switch; and connections in said passageways between said relay elements and between said terminals and said relay elements, said connections and said relay elements functioning as inner conductors and said passageways as outer conductors of coaxial paths through said switch, the operation of said relay elements modifying the inner conductors.

17. A coaxial switch for selectively connecting one coaxial conductor to one of two similar coaxial conductors comprising an input terminal, a first and a second output terminal, a first and a second impedance matching terminal, an external impedance connected to each of said matching terminals, a first, a second, a third and a fourth mercury contact polar relay, a coaxial system interconnecting said relays and connecting said relays with said input, output and matching terminals for normally connecting said input terminals through said first and said second relays to said first output terminal and for normally connecting said second output terminal through said fourth polar relay to said second impedance matching terminal, said coaxial system including metallic partially mating blocks forming outer coaxial connections, and means including said coaxial system for simultaneously operating said relays to connect said input terminal through said third and said fourth relays to said second output terminal and to connect said first output terminal through said first polar relay to said first impedance matching terminal.

18. A coaxial switch in accordance with claim 17 comprising in addition grounding circuit means for normally grounding the portion of said coaxial system between said third and said fourth relays and for grounding the portion of said coaxial system between said first and said second relays upon the simultaneous operation of all four of said relays.

References Cited in the file of this patent

UNITED STATES PATENTS

| | | |
|---|---|---|
| 2,264,124 | Schreiner | Nov. 25, 1941 |
| 2,344,780 | Kram et al. | Mar. 21, 1944 |
| 2,473,565 | Bird | June 21, 1949 |
| 2,475,464 | Shankweiler | July 5, 1949 |
| 2,609,464 | Brown et al. | Sept. 2, 1952 |